United States Patent [19]

Kawahara et al.

[11] 4,326,958
[45] Apr. 27, 1982

[54] PERMSELECTIVE MEMBRANE

[75] Inventors: Hiroshi Kawahara; Tetsuro Yasuda, both of Yokohama, Japan

[73] Assignee: Asahi Glass Company, Ltd., Tokyo, Japan

[21] Appl. No.: 174,563

[22] Filed: Aug. 4, 1980

[30] Foreign Application Priority Data

Aug. 22, 1979 [JP] Japan .................. 54/105973

[51] Int. Cl.³ .............................. B01D 31/00
[52] U.S. Cl. .................. 210/500.2; 427/245
[58] Field of Search .......... 210/500.2, 321.1, 638, 210/654; 521/27.38; 427/244–246; 260/29.3, 38

[56] References Cited

U.S. PATENT DOCUMENTS 3,648,845  3/1972  Riley .................. 210/500.2 X

FOREIGN PATENT DOCUMENTS 2391752  9/1977  France ................ 210/500.2
110619  2/1961  Pakistan .............. 210/500 M Primary Examiner—Frank A. Spear, Jr.
Attorney, Agent, or Firm—Oblon, Fisher, Spivak, McClelland & Maier

[57] ABSTRACT

A permselective membrane is obtained by fabricating and crosslinking a methylolated vinylphenol polymer having repeat units having the formula

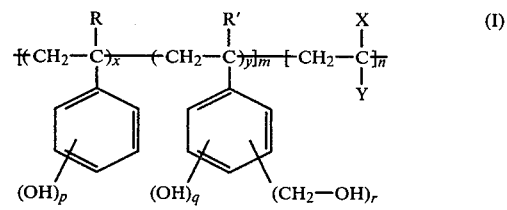

wherein p, q and r are respectively 1 or 2; x and y are respectively selected so as to give a ratio of methylol groups/hydroxy groups of from 0.01 to 2.0; m and n are respectively integers to provide $1 \geq m/m+n \geq 0.2$; and X and Y are selected from the group consisting of —R, —Cl, —Br, —CO₂R,

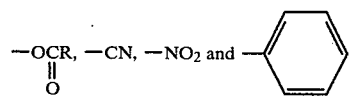

so as to copolymerize a vinyl monomer CH₂=CXY with a vinylphenol; and R, R' and R" represent hydrogen atom or a C₁–C₄ alkyl group.

10 Claims, No Drawings

PERMSELECTIVE MEMBRANE

BACKGROUND OF THE INVENTION

1. Field of the Invention

The present invention relates to a permselective membrane. More particularly, it relates to a permselective membrane having excellent water flux and solute rejection and also excellent chemical resistance, heat resistance and compaction resistance which is easily fabricatable.

2. Description of the Prior Art

In accordance with a separation with a membrane especially a reverse osmosis, a solute in an aqueous solution can be separated without a phase change whereby a cost for energy can be small. Therefore, this is practically employed in various fields such as a desalting process for brine or sea water and a separation of an inorganic material or an organic material in a medium and also will be employed in various other fields.

It has been known as typical examples of reverse osmosis membranes, to use cellulose acetate membrane in U.S. Pat. Nos. 3,133,132 and 3,133,137 by Loeb and Sourirajan; and an aromatic polyamide membrane or a polyamide hydrazide membrane in U.S. Pat. No. 3,567,632 by Richter and Hoehu. The water fluxes and solute rejections (desalting coefficient) of these membranes have not been satisfactory. Moreover, the chemical resistances, the heat resistances, compaction resistances and fabricatabilities of the membranes have various disadvantages.

SUMMARY OF THE INVENTION

It is an object of the present invention to provide a permselective membrane which has excellent water flux, solute rejection, chemical resistance, heat resistance and compaction resistance and which can be easily fabricated.

The foregoing and other objects of the present invention have been attained by providing a permselective membrane which is obtained by fabricating and cross-linking a methylolated vinylphenol polymer having repeat units having the formula

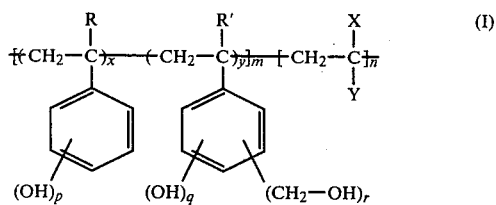

wherein p, q and r are respectively 1 or 2; x and y are respectively selected so as to give a ratio of methylol groups/hydroxy groups of from 0.01 to 2.0; m and n are respectively integers to provide $1 \geq m/m+n \geq 0.2$, more preferably $1 \geq m/m+n \geq 0.6$; and X and Y are selected from the group consisting of $-R''$, $-Cl$, $-Br$, $-CO_2R''$,

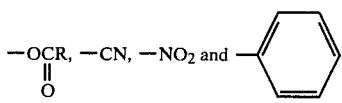

so as to copolymerize a vinyl monomer $CH_2=CXY$ with a vinylphenol; and R, R' and R'' represent hydrogen atom or a $C_1-C_4$ alkyl group.

DETAILED DESCRIPTION OF THE PREFERRED EMBODIMENTS

The methylolated vinylphenol polymer is obtained by copolymerizing the vinyl monomer having the formula $CH_2=CXY$ with a vinylphenol.

Suitable vinyl monomers include acrylic acid, methyl methacrylate, styrene, acrylonitrile, maleic anhydride and isobutylene, methyl vinyl ether, N-vinylpyrolidone, 4-vinylpyridine, sodium vinylsulfonate etc.

The permselective membrane of the present invention has excellent water flux and solute rejection, and also excellent chemical resistance in a pH range of 1 to 14, heat resistance, compact resistance, chlorine resistance and bacteria resistance and has balanced characteristics.

The fabricatability is excellent. When it is fabricated on a porous support, the process is remarkably easy and a permselective membrane having remarkably high reproducible characteristics can be obtained.

The methylolated vinylphenol polymer having repeated units having the formula (I) used in the present invention can be easily obtained by methylolating poly-(o-,m- or p-vinylphenol) by the conventional method, for example a reaction with formaldehyde.

A ratio of methylol component to the methylolated vinylphenol polymer relates to a crosslinkage and a performance of the resulting permselective membrane. When it is too small, the desired characteristics can not be given. In the formula, the ratio of x:y which relates to the ratio of the methylol component to the polymer should be selected so as to give a ratio of methylol groups to hydroxy groups of from 0.01 to 2.0 in the polymer. The ratio of methylol groups to hydroxy groups is preferably in a range of 0.1 to 1.0 in view of a stability of the methylolated vinylphenol polymer in a solution and a fabricatability for a membrane. And the ratio is more preferably in a range of 0.2 to 0.8 in view of a performance, water flux and solute rejection, of the membrane. A molecular weight of the methylolated vinylphenol polymer relates to a fabricatability for a membrane and mechanical characteristics and is preferably in a range of 300 to several hundred thousands especially 1,000 to 50,000.

The methylolated vinylphenol polymer is preferably crosslinked with a catalyst in a solvent.

The catalyst can be an inorganic acid such as sulfuric acid, hydrochloric acid and phosphoric acid or an organic acid such as acetic acid and para-toluenesulfonic acid; or a base such as alkali metal hydroxides, ammonia, amines and quaternary ammonium salts. When 0.1 to 3wt. % of sulfuric acid in a solvent is used as the catalyst, the crosslinkage and the sulfonation of the membrane are controlled to be desired degrees. Therefore, sulfuric acid is preferably used. The catalyst is usually used at a ratio of 0.05 to 10 times by weight preferably 0.25 to 2 times by weight of the methylolated vinylphenol polymer.

The solvent for the methylolated vinylphenol polymer can be any solvent such as alcohols, ketones and ethers. It is preferable to use a lower alcohols having carbon atoms of 8 or less such as methanol, ethanol, n-propanol and isopropanol; or a mixed solvent of an aqueous alcohol which contains the alcohol and less than 90 wt. % of water. When the solvent is used, a content of the methylolated vinylphenol polymer in the solvent is preferably in a range of 0.01 to 5 wt. % especially 0.1 to 3 wt. %.

The solution of the methylolated vinylphenol polymer in a solvent with a catalyst is heated at a temperature of preferably 50° to 180° C. especially 100° to 155° C. for a time of preferably 10 sec. to 6 hr. especially 0.5 min. to 1 hr. to crosslink it. The crosslinked methylolated vinylphenol polymer is obtained. The crosslinked product can be fabricated to form a membrane. Thus, it is preferable to crosslink the methylolated vinylphenol polymer during the fabrication. The fabrication is preferably carried out by using a suitable porous support to form the membrane on the porous support. The porous support can be made of cellulose esters such as nitrocellulose and cellulose acetate; polysulfone, polyethersulfone, polystyrene, polyvinyl chloride, chlorinated polyvinyl chloride, polycarbonate, polyacryronitrile and polyesters. The polymer can be reinforced with a woven or nonwoven fabric etc. A pore diameter of the porous support is preferably less than 5000 Å especially less than 1000 Å for especially high solute rejection, when the permselective membrane is used as a reverse osmosis membrane. A configuration of the porous support can be a flat configuration as well as a tubular or hollow configuration. A configuration of the permselective membrane of the present invention can be varied depending upon the configuration of the porous support.

The optimum porous support is made of a polysulfone and is preferably a product having a thickness of 10 to 500μ obtained by flow-spreading a solution of the polysulfone in a polar solvent such as dimethylformamide in a form of a sheet and immersing it into water.

The crosslinking and fabrication of the methylolated vinylphenol polymer on the porous support can be carried out by a suitable process such as a process for flow-spreading the solution of the methylolated vinylphenol polymer with the acid on the porous support; a process for spraying or coating the solution; a process for floating the porous support on the solution and a process for immersing the solution into the porous support.

In the fabrication, the stability of the membrane can be improved by incorporating a surfactant such as sodium laurylsulfate, sodium alkylbenzenesulfonate, and polyethyleneoxide in the solution of the methylolated vinylphenol polymer, at a ratio of 0.01 to 1 wt. %.

A thin layer of the solution of the methylolated vinylphenol polymer is formed on one or both surface of the porous support and a part or whole of the solvent is evaporated and the membrane is heat-treated for a suitable time to perform the crosslinking treatment.

The resulting permselective membrane of the methylolated vinylphenol polymer is supposed to have a pore diameter of 5 to 300 Å. The membrane formed on the porous support has thickness of 50 to 5000 Å, more preferably of 100 to 1000 Å in practical applications.

The characteristics for the permselective membrane especially the water flux can be further improved by immersing the membrane of the methylolated vinylphenol polymer in an aqueous solution of an organic or inorganic acid or base or a salt thereof.

The compounds used for the post-treatment can be organic acids such as sulfuric acid, sulfuric acid anhydride, chlorosulfonic acid, hydrochloric acid, and phosphoric acid; organic acids such as methane sulfonic acid and benzenesulfonic acid; carboxylic acids such as acetic acid, maleic acid, benzoic acid and iminodiacetic acid; phenols such as phenol and catechol; alkali metal salts and alkaline earth metal salts thereof; and inorganic bases such as sodium hydroxide, barium hydroxide and ammonia; and organic bases such as triethylamine, ethylenediamine and polyethyleneimine.

When the permselective membrane of the present invention is produced from a vinylphenol polymer, it is possible to simultaneously carry out the methylolation, the crosslinking and the fabrication.

In such process, an alcoholic aqueous solution of the vinylphenol polymer, formaldehyde and an acid is heat-treated to perform the methylolation and the partial crosslinking and the solution is coated on or immersed into the porous support and is heated to complete the crosslinkage.

In the examples, the solute rejection is given by the following equation:

$$\text{Solute rejection (\%)} = \left( \frac{\text{Solute content in feed solution} - \text{Solute content in permeated solution}}{\text{Solute content in feed solution}} \right) \times 100$$

The present invention will be further illustrated by certain examples and references which are provided for purposes of illustration only and are not intended to be limiting the present invention.

EXAMPLE 1

A solution containing 0.5 wt. part of methylolated poly-p-vinylphenol (a ratio of methylol groups to hydroxy groups of 0.33; average molecular weight of about 5,000), 0.5 wt. part of conc. sulfuric acid, 0.05 wt. part of sodium laurylsulfate, 66 wt. parts of water and 33 wt. parts of isopropylalcohol, was prepared. A porous polysulfone support membrane having a thickness of 60μ was obtained by coating 15% solution of polysulfone (P-3500; UCC) in dimethylformamide on a glass plate and dipping them into water and was dipped into the solution of methylolated poly-p-vinylphenol for 5 min. The treated support membrane was taken up and vertically held at the ambient temperature for 1 min. in air and was heated and dried in an air-oven at 150° C. for 15 minutes to perform a crosslinking reaction and then, the membrane was dipped into an aqueous solution of barium hydroxide as the ambient temperature for 15 minutes.

A reverse osmosis test of the resulting permselective membrane was carried out by using 3.5 wt. % aqueous solution of sodium chloride under a pressure of 60 kg./cm² at the ambient temperature. After 24 hr., a salt rejection was 99.2% and a water flux was 0.36 m³/m²-day. After 800 hr., a salt rejection was 99.1% and a water flux was 0.34 m³/m²-day.

EXAMPLE 2

In accordance with the process of Example 1 except that 0.05 wt. part of sodium laurylsulfate is not incorporated, a permselective membrane was prepared and tested. A salt rejection was 98.7% and a water flux was 0.40 m³/m²-day.

EXAMPLE 3

In accordance with the process of Example 1 except that the treatment in the 0.1 wt. % aqueous solution of barium hydroxide was not carried out, a permselective membrane was prepared and tested. A salt rejection was 99.1% and a water flux was 0.38 m³/m²-day.

EXAMPLE 4

In accordance with the process of Example 1 except that 66 wt. parts of water and 40 wt. parts of ethyl alcohol were used instead of 66 wt. parts of water and 33 wt. parts of isopropyl alcohol, a permselective membrane was prepared and tested. A salt rejection was 99.6% and a water flux was 0.29 m³/m²-day.

EXAMPLE 5

In accordance with the process of Example 1 except that 1.0 wt. part of the methylolated poly-p-vinylphenol and 1.0 wt. part of conc. sulfuric acid were used to vary the ratios, a permselective membrane was prepared and tested. A salt rejection was 98.9% and a water flux was 0.32 m³/m²-day.

REFERENCE 1

In accordance with the process of Example 5 except that 1.0 wt. part of poly-p-vinylphenol was used instead of the methylolated poly-p-vinylphenol, a permselective membrane was prepared and tested. A salt rejection was 21% and a water flux was 0.26 m³/m²-day.

EXAMPLE 6

In accordance with the process of Example 1 except that 0.5 wt. part of methylolated poly-p-vinylphenol having a ratio of methylol groups to hydroxy groups of 0.16 was used as the methylolated poly-p-vinylphenol, a permselective membrane was prepared and tested. A salt rejection was 90% and a water flux was 0.55 m³/m²-day.

EXAMPLE 7

In accordance with the process of Example 1 except that a kind of the methylolated poly-p-vinylphenol and the ratios to water and isopropyl alcohol were varied to use 0.5 wt. part of methylolated poly-p-vinylphenol having a ratio of methylol groups to hydroxy groups of 1.20 and 40 wt. parts of water and 60 wt. parts of isopropyl alcohol were used, a permselective membrane was prepared and tested. A salt rejection was 92.0% and a water flux was 0.08 m³/m²-day.

EXAMPLE 8 to 11

The permselective membrane obtained in Example 1 was dipped in each of the following solutions in the following conditions. Each reverse osmosis test of each permselective membrane was carried out by using 3.5 wt. % aqueous solution of sodium chloride under a pressure of 60 kg./cm² at the ambient temperature. The results are shown in Table 1.

TABLE 1

| | Condition for dipping membrane | Salt rejection (%) | Water flux (m³/m² day) |
|---|---|---|---|
| Exp. 8 | water, 60° C.: 80 hr. | 99.0 | 0.36 |
| Exp. 9 | 1N—H₂SO₄ Ambient temp. 200 hr. | 98.8 | 0.34 |
| Exp. 10 | 1N—NaOH Ambient temp. 40 days | 97.8 | 0.45 |
| Exp. 11 | 50 ppm NaOCl Ambient temp. 60 hr. | 98.5 | 0.37 |

The results show that the permselective membranes of the present invention have excellent heat resistance, pH change resistance and chlorine resistance.

EXAMPLE 12

A solution was prepared by dissolving 1.0 wt. part of poly-p-vinylphenol having a molecular weight of about 5,000, 0.24 wt. part of 35% aqueous solution of formaline, 0.10 wt. part of sodium laurylsulfate, 1.0 wt. part of conc. sulfuric acid in a mixed solvent of 132 wt. parts of water and 66 wt. parts of isopropyl alcohol and mixing them at 60° C. for 3 hr. and cooling the reaction mixture to the ambient temperature.

The porous polysulfone support membrane having a thickness of 60μ was dipped into the reaction mixture for 5 min. and the treated support membrane was taken up and vertically held at the ambient temperature for 1 min. in air and heated and dried in an airoven at 150° C. for 15 min. to perform a crosslinking reaction. The resulting membrane was dipped into 0.1 wt. % aqueous solution of barium hydroxide at the ambient temperature for 15 min. The reverse osmotic test of the permselective membrane was carried out by using 3.5 wt. % aqueous solution of sodium chloride under a pressure of 60 kg./cm² at the ambient temperature. A salt rejection was 98.2% and a water flux was 0.44 m³/m²-day.

EXAMPLE 13

A polymer obtained by a radical polymerization of 80 wt. parts of p-vinylphenol and 20 wt. parts of acrylic acid was methylolated with formaline to give a ratio of methylol groups to hydroxy groups of 0.25.

In accordance with the process of Example 1 except that 0.5 wt. part of the resulting polymer was used instead of 0.5 wt. part of the methylolated polyvinylphenol, a permselective membrane was prepared and tested. A salt rejection was 97.7% and a water flux was 0.62 m³/m²-day.

EXAMPLE 14

In accordance with the process of Example 13 except that 20 wt. parts of styrene was used instead of 20 wt. parts of acrylic acid, a permselective membrane was prepared and tested. A salt rejection was 98.4% and a water flux was 0.25 m³/m²-day.

EXAMPLE 15

A polymer obtained by a copolymerization of 95 mol. % of p-vinylphenol and 5 mol. % of sodium vinylsulfonate, was methylolated with formaline to give a ratio of methylol groups to hydroxy groups of 0.3.

In accordance with the process of Example 1 except that 0.5 wt. part of the polymer was used instead of 0.5 wt. part of the polymer of Example 1, a permselective membrane was prepared and tested. A salt rejection was 98.5% and a water flux was 0.41 m³/m²-day.

EXAMPLE 16

In accordance with the process of Example 15 except that 5 mol. % of N-vinylpyrrolidone was used instead of 5 mol. % of sodium vinylsulfonate, a permselective membrane was prepared and tested. A salt rejection was 96.3% and a water flux was 0.43 m³/m²-day.

EXAMPLES 17 to 25

The permselective membrane obtained in Example 1 was dipped in each solution in the following conditions and then, each reverse osmosis test was carried out by using 0.5 wt. % aqueous solution of sodium chloride under a pressure of 40 kg./cm². The results are shown in Table 2.

TABLE 2

| | Condition for post-treatment | Salt rejection (%) | Water flux (m³/m² day) |
|---|---|---|---|
| Exp. 17 | 1% aq. sol. of acetic acid 60° C.: 15 min. | 99.1 | 0.45 |
| Exp. 18 | 1% aq. sol. of sodium iminodiacetate 60° C.: 15 min. | 99.4 | 0.64 |
| Exp. 19 | 90% H₂SO₄ ambient temp.; 1 hr. | 99.2 | 0.98 |
| Exp. 20 | 1% ammonia ambient temp.; 7 day | 99.0 | 0.75 |
| Exp. 21 | 1% aq. sol. of urea ambient temp.; 20 hr. | 98.0 | 0.47 |
| Exp. 22 | 1% aniline ambient temp.; 20 hr. | 98.2 | 0.49 |
| Exp. 23 | 1% phenolsulfonic acid ambient temp.; 1 day | 98.8 | 0.60 |
| Exp. 24 | 10% triethylamine ambient temp.; 4 day | 98.9 | 0.65 |
| Exp. 25 | gaseous SO₃ ambient temp.; 15 min. | 98.7 | 0.78 |

I claim:

1. A permselective membrane which is obtained by fabricating and crosslinking a methylolated vinylphenol polymer having repeat units having the formula

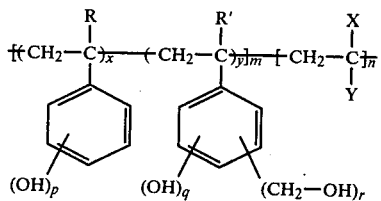

wherein p, q and r are respectively 1 or 2; x and y are respectively selected so as to give a ratio of methylol groups/hydroxy groups of from 0.01 to 2.0; m and n are respectively integers to provide $1 \geq m/m+n \geq 0.2$; and X and Y are selected from the group consisting of —R″, —Cl, —Br, —CO₂R″,

so as to copolymerize a vinyl monomer CH₂=CXY with a vinylphenol; and R, R′ and R″ represent hydrogen atom or a C₁–C₄ alkyl group.

2. The permselective membrane according to claim 1 wherein said vinyl monomer CH₂=CXY is acrylic acid, methyl methacrylate, styrene, acrylonitrile, maleic anhydride, isobutylene, N-vinylpyrolidone, 4-vinylpyridine or sodium vinylsulfonate.

3. The permselective membrane according to claim 1 or 2 wherein which is crosslinked by a heat-treatment with an acid or a base as a catalyst.

4. The permselective membrane according to claim 1 or 2 which is crosslinked with sulfuric acid as a catalyst.

5. The permselective membrane according to claim 1, which is crosslinked on a porous support in the fabrication.

6. The permselective membrane according to claim 5 wherein said porous support has a thickness of 10 to 500μ.

7. The permselective membrane according to claim 5 wherein said porous support is made of a polymer selected from a group consisting of cellulose esters, polysulfone, polyethersulfone, polystyrene, polyvinyl chloride, chlorinated polyvinyl chloride, polycarbonate, polyacrylonitrile and polyesters.

8. The permselective membrane according to claim 6 or 7 wherein a thickness of said methylolated vinylphenol polymer on said porous support is in a range of 50 to 5000 Å.

9. The permselective membrane according to claim 1 or 5 wherein said membrane is dipped in an aqueous solution of an organic or inorganic acid or a base or a salt thereof and is heat-treated.

10. The permselective membrane according to claim 1, or 5 wherein said permselective membrane is a reverse osmosis membrane or an ultrafilter.

* * * * *